United States Patent
Poliashenko

(10) Patent No.: US 10,375,084 B2
(45) Date of Patent: Aug. 6, 2019

(54) METHODS AND APPARATUSES FOR IMPROVED NETWORK COMMUNICATION USING A MESSAGE INTEGRITY SECURE TOKEN

(71) Applicant: Hyland Software, Inc., Westlake, OH (US)

(72) Inventor: Yana Poliashenko, Alpharetta, GA (US)

(73) Assignee: HYLAND SOFTWARE, INC., Westlake, OH (US)

( * ) Notice: Subject to any disclaimer, the term of this patent is extended or adjusted under 35 U.S.C. 154(b) by 196 days.

(21) Appl. No.: 15/476,719

(22) Filed: Mar. 31, 2017

(65) Prior Publication Data
US 2018/0288068 A1    Oct. 4, 2018

(51) Int. Cl.
*H04L 29/06* (2006.01)
*H04L 12/26* (2006.01)
*H04L 9/32* (2006.01)

(52) U.S. Cl.
CPC .......... *H04L 63/123* (2013.01); *H04L 9/3236* (2013.01); *H04L 43/106* (2013.01); *H04L 63/0807* (2013.01); *H04L 63/1466* (2013.01)

(58) Field of Classification Search
CPC . H04L 63/123; H04L 63/1466; H04L 9/3236; H04L 43/106
See application file for complete search history.

(56) References Cited

U.S. PATENT DOCUMENTS

| | | | | |
|---|---|---|---|---|
| 2007/0192404 A1* | 8/2007 | School | ................ | H04L 63/0442 709/203 |
| 2009/0006851 A1* | 1/2009 | Freeman | ............. | H04L 63/0442 713/170 |
| 2015/0326539 A1* | 11/2015 | Sharma | ................. | H04L 9/3242 713/168 |

* cited by examiner

*Primary Examiner* — Baotran N To
(74) *Attorney, Agent, or Firm* — Medley, Behrens & Lewis, LLC

(57) ABSTRACT

Embodiments are disclosed for limiting an attack surface of a server application by enforcing integrity of a message transmitted to the server application. An example method includes receiving, by communications circuitry of a receiving system hosting the server application, a message including specific message content and a token. The example method further includes determining, by authentication circuitry of the receiving system and using the specific message content, whether the token comprises a valid message integrity secure token. If the token comprises a valid message integrity secure token, the example method further includes performing, by response circuitry of the receiving system, an operation in response to the message. If not, the method may include generating, by the authentication circuitry of the receiving system, an error message. Corresponding apparatuses and computer program products are also provided.

20 Claims, 7 Drawing Sheets

METHODS AND APPARATUSES FOR IMPROVED NETWORK COMMUNICATION USING A MESSAGE INTEGRITY SECURE TOKEN

TECHNOLOGICAL FIELD

Example embodiments of the present invention relate generally to network security management and, more particularly, to methods and apparatuses that utilize a message integrity secure token to enforce message integrity in network transmissions.

BACKGROUND

Secure tokens are commonly used to enforce authentication of messages transmitted between two integrated systems. By using a secure token for authentication, integrated systems can reduce the need to exchange security credentials otherwise necessary to authenticate every call between the systems. For instance, a secure token can be included in a request by a calling system to access a particular resource through a particular endpoint of a receiving system. The request can be authenticated through analysis of the secure token included in the request rather than by requiring a less secure procedure requiring the exchange of login credentials.

However, when a secure token can be reused, there exists a possibility of a replay attack, in which a malicious party steals the secure token from examination of an authentic transmission, and then reuses the token for malicious purposes, such as to make calls to the server system for different resources from the same or a different end point. Thus, reusability of a secure token introduces some risk of a replay attack enabling a malicious user who steals the secure token to invoke functionality that he/she is not entitled to.

One possible way to overcome this vulnerability is to employ single-use tokens in place of reusable tokens. While integrated systems relying on single use tokens can theoretically avoid vulnerability to a replay attack, implementation of a system reliant on single use tokens has a drawback in that the receiving system must be able to verify whether each secure token included in a message has been used previously. This verification procedure necessarily requires the receiving system to maintain a repository of all previously used tokens, which over time becomes computationally expensive. But without resort to single-use token systems, a window will theoretically always exist during which a system is vulnerable to a replay attack. Accordingly, a need exists to increase the security of network transmissions by reducing the vulnerability to a replay attack made using a stolen secure tokens.

BRIEF SUMMARY

Example embodiments described herein address the above deficiency (among others), and provide methods and apparatuses that limit the attack surface of a server application hosted by a receiving system. To do this, such methods and apparatuses use a message integrity secure token (e.g., a MIST token) that enforces the integrity of a message to the receiving system. Example embodiments described herein generate a MIST token from a calling system's credentials, but unlike the procedure for generation of traditional tokens, the MIST token is generated using both the calling system credentials and specific message content taken from the message that is being transmitted itself. In this fashion, example embodiments disrupt potential for malicious use of stolen tokens, because even if a message is intercepted and the MIST token is stolen, the MIST token is not valid when transmitted with a message that has modified any portion of the specific message content used to generate the MIST token. While a replay attack based on a reusable token can never be entirely prevented in theory, enforcing the integrity of a message transmitted using a MIST token prevents message tampering by malicious parties. Accordingly, example embodiments described herein greatly limit the attack surface of a server application. In addition, example embodiments facilitate modification of the security of the MIST token authentication procedures contemplated herein. In this regard, the procedure for generating a MIST token can be reconfigured in runtime on both source and target systems, thus reducing the response time needed to react to a security breach.

In a first example embodiment, a method is provided for limiting an attack surface of a server application by verifying integrity of messages transmitted to the server application. The method includes receiving, by communications circuitry of a receiving system hosting the server application, a message including specific message content and a token, and determining, by authentication circuitry of the receiving system and using the specific message content, whether the token comprises a valid message integrity secure token. In this regard, the token comprises a valid message integrity secure token in an instance in which the token matches a result produced by applying a one-way hash function to a combination of (1) a calling system credential and (2) a particular portion of the specific message content. The method further includes, in an instance in which the authentication circuitry of the receiving system determines that the token comprises a valid message integrity secure token, performing, by response circuitry of the receiving system, an operation in response to the message.

In some embodiments, determining whether the token comprises a valid message integrity secure token includes retrieving, from a memory of the receiving system, a calling system credential, the one-way hash function, and a framework for deriving the particular portion of the specific message content, deriving, by the authentication circuitry of the receiving system and using the retrieved framework and the specific message content, the particular portion of the specific message content, generating, by the authentication circuitry of the receiving system, a verification message integrity security token by applying the retrieved one-way hash function to a combination of the retrieved calling system credential and the derived particular portion of the specific message content, comparing, by the authentication circuitry of the receiving system, the token to the verification message integrity security token, and in an instance in which the token matches the verification message integrity security token, determining, by the authentication circuitry of the receiving system, that the token comprises a valid message integrity secure token. In some such embodiments, the specific message content includes a calling application identifier, and wherein at least one of the one-way hash function and the framework is retrieved using the calling application identifier. Additionally or alternatively, the framework for deriving the particular portion of the specific message content may define a set of constituent components of the specific message content that comprise the particular portion of the specific message content. In another additional or alternative embodiment, the framework for deriving the particular portion of the specific message content further identifies an order in which the one-way hash function must be applied to the constituent components of the specific message content and to the calling system credential in order to generate the verification message integrity security token.

In some embodiments, the specific message content includes a time stamp, a calling application identifier, a calling system identifier, a target end point, and a set of additional input parameters.

In some embodiments, the portion of the specific message content comprises an entirety of the specific message content.

In some embodiments, the method further includes, in an instance in which the authentication circuitry of the receiving system determines that the token does not comprise a valid message integrity secure token, generating, by the authentication circuitry of the receiving system, an error message.

In a second example embodiment, a receiving system apparatus is provided for limiting an attack surface of a server application hosted by the receiving system apparatus by verifying integrity of messages transmitted to the server application. The receiving system apparatus comprising communications circuitry configured to receive a message including specific message content and a token, authentication circuitry configured to determine, using the specific message content, whether the token comprises a valid message integrity secure token, wherein the token comprises a valid message integrity secure token in an instance in which the token matches a result produced by applying a one-way hash function to a combination of (1) a calling system credential and (2) a particular portion of the specific message content; and response circuitry configured to perform, in an instance in which the authentication circuitry determines that the token comprises a valid message integrity secure token, an operation in response to the message.

In some embodiments, the authentication circuitry of the receiving system apparatus is configured to determine whether the token comprises a valid message integrity secure token by retrieving, from a memory of the receiving system apparatus, a calling system credential, the one-way hash function, and a framework for deriving the particular portion of the specific message content, deriving, using the retrieved framework and the specific message content, the particular portion of the specific message content, generating a verification message integrity security token by applying the retrieved one-way hash function to a combination of the retrieved calling system credential and the derived particular portion of the specific message content, comparing the token to the verification message integrity security token, and in an instance in which the token matches the verification message integrity security token, determining that the token comprises a valid message integrity secure token. In some such embodiments, the specific message content includes a calling application identifier, and wherein at least one of the one-way hash function and the framework is retrieved using the calling application identifier. Additionally or alternatively, the framework for deriving the particular portion of the specific message content may define a set of constituent components of the specific message content that comprise the particular portion of the specific message content. In another additional or alternative embodiment, the framework for deriving the particular portion of the specific message content further identifies an order in which the one-way hash function must be applied to the constituent components of the specific message content and to the calling system credential in order to generate the verification message integrity security token.

In some embodiments, the specific message content includes a time stamp, a calling application identifier, a calling system identifier, a target end point, and a set of additional input parameters.

In some embodiments, the portion of the specific message content comprises an entirety of the specific message content.

In some embodiments, the authentication circuitry of the receiving system apparatus is further configured to generate an error message in an instance in which the authentication circuitry of the receiving system determines that the token does not comprise a valid message integrity secure token.

In a third example embodiment, a computer program product is provided for limiting an attack surface of a server application by verifying integrity of messages transmitted to the server application. The computer program product includes at least one non-transitory computer-readable storage medium storing computer-executable instructions that, when executed, cause a receiving system hosting the server application to receive a message including specific message content and a token, and determine, using the specific message content, whether the token comprises a valid message integrity secure token. In this regard, the token comprises a valid message integrity secure token in an instance in which the token matches a result produced by applying a one-way hash function to a combination of (1) a calling system credential and (2) a particular portion of the specific message content. The computer-executable instructions that, when executed, further cause the receiving system to, in an instance in which the receiving system determines that the token comprises a valid message integrity secure token, perform an operation in response to the message.

In some embodiments, determining whether the token comprises a valid message integrity secure token includes retrieving, from a memory of the receiving system, a calling system credential, the one-way hash function, and a framework for deriving the particular portion of the specific message content, deriving, by the authentication circuitry of the receiving system and using the retrieved framework and the specific message content, the particular portion of the specific message content, generating, by the authentication circuitry of the receiving system, a verification message integrity security token by applying the retrieved one-way hash function to a combination of the retrieved calling system credential and the derived particular portion of the specific message content, comparing, by the authentication circuitry of the receiving system, the token to the verification message integrity security token, and in an instance in which the token matches the verification message integrity security token, determining, by the authentication circuitry of the receiving system, that the token comprises a valid message integrity secure token. In some such embodiments, the specific message content includes a calling application identifier, and wherein at least one of the one-way hash function and the framework is retrieved using the calling application identifier. Additionally or alternatively, the framework for deriving the particular portion of the specific message content may define a set of constituent components of the specific message content that comprise the particular portion of the specific message content. In another additional or alternative embodiment, the framework for deriving the particular portion of the specific message content further identifies an order in which the one-way hash function must be applied to the constituent components of the specific message content and to the calling system credential in order to generate the verification message integrity security token.

In some embodiments, the specific message content includes a time stamp, a calling application identifier, a calling system identifier, a target end point, and a set of additional input parameters.

In some embodiments, the portion of the specific message content comprises an entirety of the specific message content.

In some embodiments, the computer-executable instructions, when executed, cause the receiving system to, in an instance in which the receiving system determines that the token does not comprise a valid message integrity secure token, generate an error message.

In a fourth example embodiment, a method is provided for enhancing trustworthiness of a message generated by a calling application. The method includes generating, by message generation circuitry of a calling system hosting the calling application, specific message content for the message, generating, by the message generation circuitry of the calling system, a message integrity secure token by applying a one-way hash function to a combination of a calling system credential that is not included in the specific message content and a particular portion of the specific message content, generate the message by the message generation circuitry of the calling system, wherein the message includes the specific message content and the message integrity secure token, and transmitting the message by communications circuitry of the calling system.

In some embodiments, the method further includes, prior to generating the message integrity secure token: retrieving, from a memory of the calling system, the calling system credential, the one-way hash function, and a framework for deriving the particular portion of the specific message content; and deriving, by the message generation circuitry of the calling system and using the retrieved framework and the specific message content, the particular portion of the specific message content. In some such embodiments, the method further includes retrieving a calling application identifier, wherein at least one of the one-way hash function and the framework is retrieved using the calling application identifier. Additionally or alternatively, the framework for deriving the particular portion of the specific message content may define a set of constituent components of the specific message content that comprise the particular portion of the specific message content. Moreover, the framework for deriving the particular portion of the specific message content may further identify an order in which the one-way hash function must be applied to the constituent components of the specific message content and to the calling system credential in order to generate the message integrity secure token.

In some embodiments, the specific message content includes a time stamp, a calling application identifier, a calling system identifier, a target end point, and a set of additional input parameters.

In some embodiments, the portion of the specific message content comprises an entirety of the specific message content.

In a fifth example embodiment, a calling system apparatus is provided for enhancing trustworthiness of a message generated by a calling application. The calling system apparatus includes message generation circuitry configured to (1) generate specific message content for the message, (2) generate a message integrity secure token by applying a one-way hash function to a combination of a calling system credential and a particular portion of the specific message content, and (3) generate the message by the message generation circuitry of the calling system, wherein the message includes the specific message content and the message integrity secure token. The calling system apparatus further includes communications circuitry configured to transmit the message.

In some embodiments, the message generation circuitry is further configured to, prior to generating the message integrity secure token: retrieve, from a memory of the calling system, the calling system credential, the one-way hash function, and a framework for deriving the particular portion of the specific message content; and derive, and using the retrieved framework and the specific message content, the particular portion of the specific message content. In some such embodiments, the message generation circuitry is further configured to retrieve a calling application identifier, wherein at least one of the one-way hash function and the framework is retrieved using the calling application identifier. Additionally or alternatively, the framework for deriving the particular portion of the specific message content may define a set of constituent components of the specific message content that comprise the particular portion of the specific message content. Moreover, the framework for deriving the particular portion of the specific message content may further identify an order in which the one-way hash function must be applied to the constituent components of the specific message content and to the calling system credential in order to generate the message integrity secure token.

In some embodiments, the specific message content includes a time stamp, a calling application identifier, a calling system identifier, a target end point, and a set of additional input parameters.

In some embodiments, the portion of the specific message content comprises an entirety of the specific message content.

In a sixth example embodiment, a computer program product is provided for enhancing trustworthiness of a message generated by a calling application. The computer program product includes at least one non-transitory computer-readable storage medium storing computer-executable instructions that, when executed, cause a calling system hosting the calling application to generate specific message content for the message, generating, a message integrity secure token by applying a one-way hash function to a combination of a calling system credential that is not included in the specific message content and a particular portion of the specific message content, and generate the message, wherein the message includes the specific message content and the message integrity secure token. The computer-executable instructions, when executed, further cause the calling system to transmit the message by communications circuitry of the calling system.

In some embodiments, the computer-executable instructions, when executed, further cause the calling system to, prior to generating the message integrity secure token: retrieve, from a memory of the calling system, the calling system credential, the one-way hash function, and a framework for deriving the particular portion of the specific message content; and derive, using the retrieved framework and the specific message content, the particular portion of the specific message content. In some such embodiments, the computer-executable instructions, when executed, further cause the calling system to retrieve a calling application identifier, wherein at least one of the one-way hash function and the framework is retrieved using the calling application identifier. Additionally or alternatively, the framework for deriving the particular portion of the specific message content may define a set of constituent components of the specific message content that comprise the particular portion of the specific message content. Moreover, the framework for deriving the particular portion of the specific message content may further identify an order in which the one-way hash function must be applied to the constituent components of the specific message content and to the calling system credential in order to generate the message integrity secure token.

In some embodiments, the specific message content includes a time stamp, a calling application identifier, a calling system identifier, a target end point, and a set of additional input parameters.

In some embodiments, the portion of the specific message content comprises an entirety of the specific message content.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings, which are not necessarily drawn to scale.

DETAILED DESCRIPTION

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention.

Overview

Figure 1:
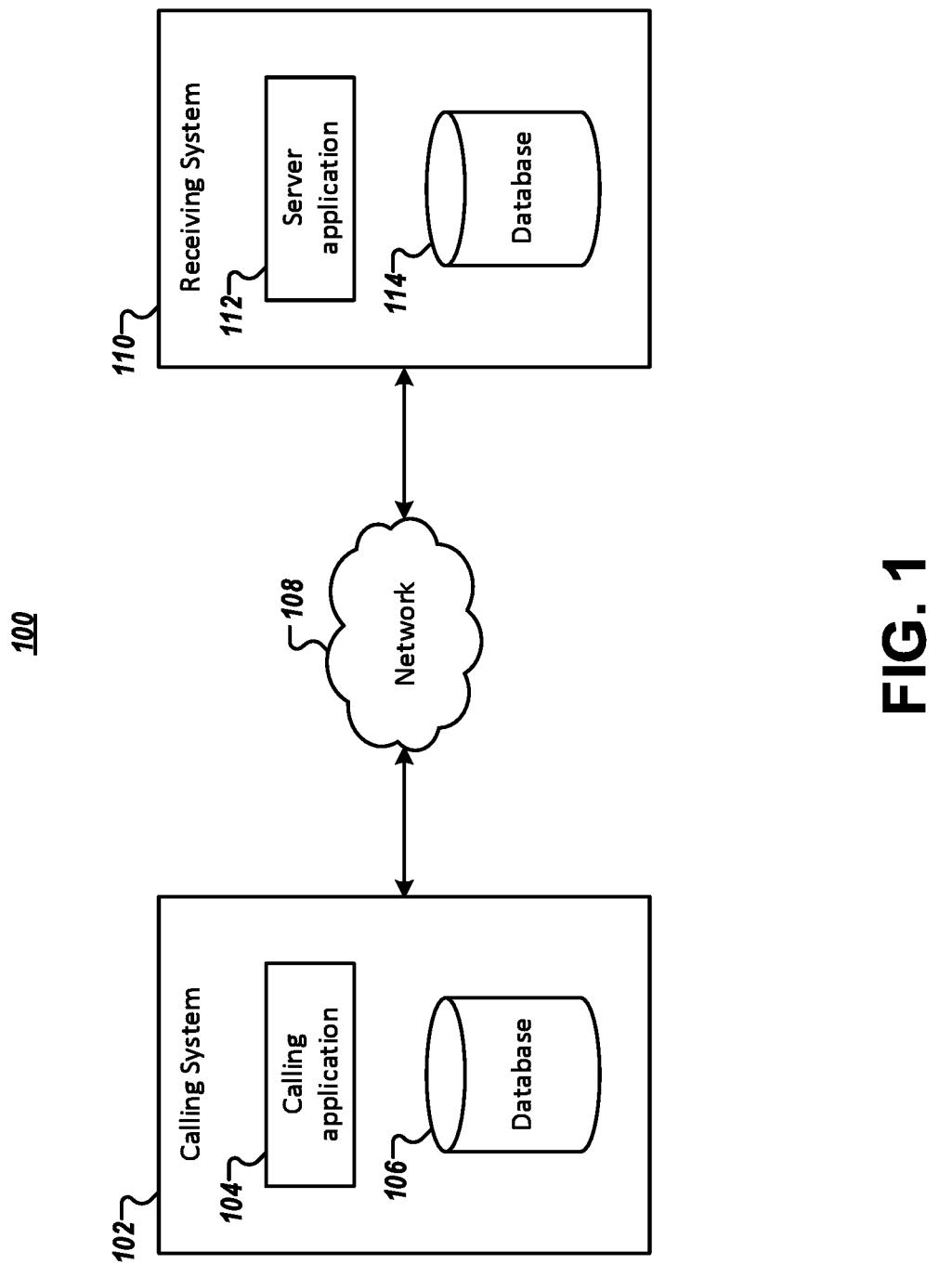
FIG. 1 illustrates an example system within which example embodiments described herein may function.

FIG. 1 illustrates a diagram of a typical system integration 100 involving a calling system 102 and a receiving system 110. Although described as calling system and receiving systems, respectively, it will be understood that either system may transmit and/or receive messages from the other. Calling system 102 may host one or more calling application 104, as well as one or more database 106 storing data retrieved and/or collected by various calling applications hosted by the calling system 102. Similarly, receiving system 110 may host one or more server application 112 as well as one or more database 114 storing data retrieved and/or collected by various server applications 112 hosted by the receiving system 110.

The two systems may be connected as shown in system integration 100 by a network 108. In many cases, this network 108 may comprise the public Internet or any other network that may be less secure and/or less controlled than an organization's own intranet. Historically, any given server application 112 may expose many APIs to calling applications, and when accessible from an uncontrolled network 108, many of those APIs may facilitate access by malicious parties to potentially sensitive data stored in a database 114 or otherwise accessible by the server application 112. Preventing such malicious access historically required walling of the server application 112 from the external sources or manually updating the server application to mitigate the security threat. Both are costly approaches, because they either reduce the usefulness of the server application 112 or require what often amounts to significant manual investment hardening the server application 112.

Example embodiments described herein address the above deficiency (among others), and provide methods and apparatuses that limit the attack surface of a server application hosted by a receiving system. To do this, such methods and apparatuses use a message integrity secure token (e.g., a MIST token) that enforces the integrity of a message to the receiving system. Example embodiments described herein generate a MIST token from a calling system's credentials, but unlike the procedure for generation of traditional tokens, the MIST token is generated using both the calling system credentials and specific message content taken from the message that is being transmitted itself. Specifically, example embodiments utilize a one-way hash function that hashes a calling system credential with a portion of the specific message content defined by a framework available to both the calling system and the receiving system.

In order for both a calling system and a receiving system to be able to utilize this MIST token authentication, the calling system credential, the one-way hash function, and the framework are exchanged between the systems in advance of implementation and via a separate channel distinct from the network using which secured messages will be conveyed. For instance, system administrators of the two systems may use physical mail, phone conversations, or any alternative communications channel than the channel that will be secured, thus ensuring that the calling system credential, the one-way hash function, and the framework are never exposed by either system via the network that will thereafter be used for secure communication.

In this fashion, example embodiments disrupt potential for malicious use of stolen tokens, because even if a message is intercepted and the MIST token is stolen, the MIST token is not valid when transmitted with a message that has modified any portion of the specific message content used to generate the MIST token. While a replay attack based on a reusable token can never be entirely prevented in theory, enforcing the integrity of a message transmitted using a MIST token prevents message tampering by malicious parties. Moreover, hashing many of the data elements of the message to create the secure token also reduces the likelihood that a hacker can figure out how to create a new MIST token. Accordingly, example embodiments described herein greatly limit the attack surface of a server application.

As noted previously, secure tokens are commonly used to enforce authentication of messages transmitted between two systems such as those shown in FIG. 1. By using a secure token for authentication, integrated systems can thus provide a layer of security and reduce the need to exchange security credentials otherwise necessary to authenticate every call between the systems. However, when a secure token can be reused, there exists a possibility of a replay attack, so even with use of secure tokens, reusability of such token introduces some risk of malicious access.

Figure 2A:
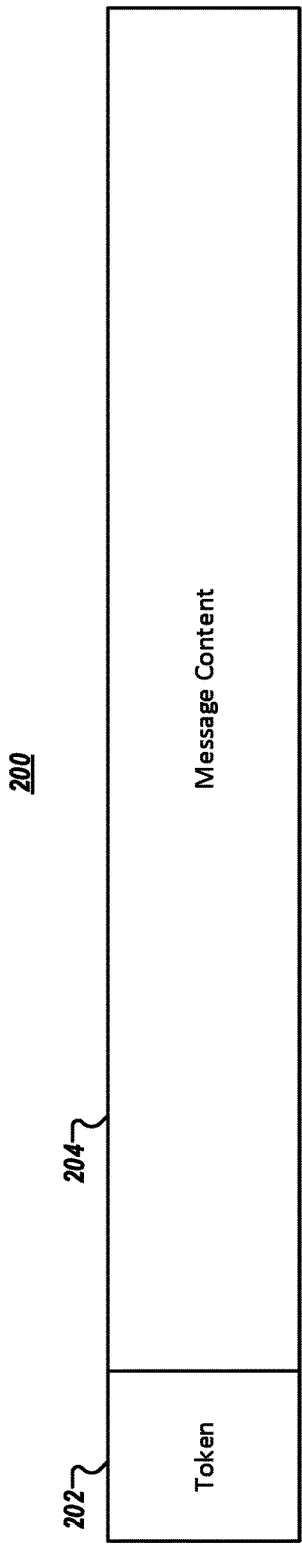
FIG. 2A illustrates an example message used by traditional systems invoking secure tokens.

For instance, FIG. 2A illustrates an example message 200 that might traditionally be transmitted in a traditional system utilizing secure tokens for credentialing purposes. The message 200 includes two distinct components: a token 202, and a set of message content 204. If the token 202 is stolen or otherwise made available to a malicious entity, the token can be appended to nearly any message and transmitted to the server application 112 to potentially access sensitive data of the receiving system 110. This is because the content of the token 202 does not enforce integrity of the message content 204, and the message content 204 can thus be altered without notice by either the calling application 104 or the server application 112.

Figure 2B:
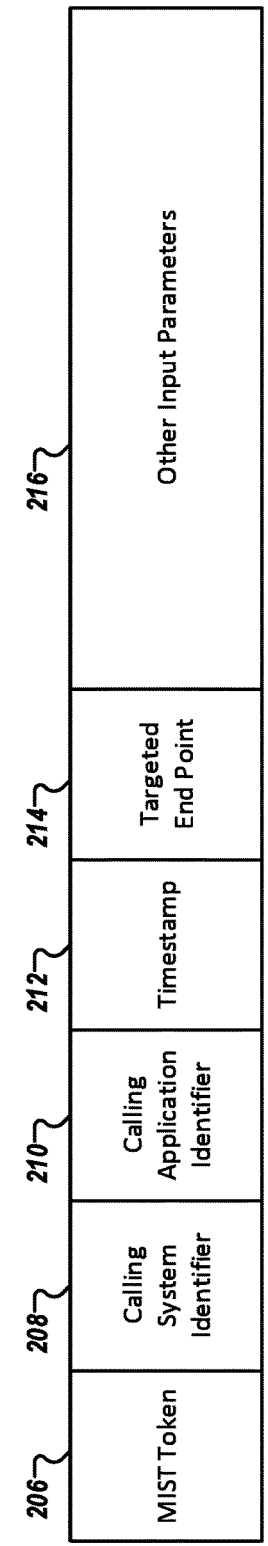
FIG. 2B illustrates an example message that may be generated or received in accordance with some example embodiments described herein.

Turning now to FIG. 2B, an example message 250 is shown that addresses this sort of message integrity breach. Message 250, which may be generated by calling system 102, includes a message integrity secure token 206 (e.g., MIST token) that is created using a digest (e.g., hash) of the calling system's credentials (which may be exchanged by system administrators of calling system 102 and receiving system 110 and which may have been issued from an authentication server) as well as multiple elements of the specific message for which the token is being created (e.g., the calling system identifier 208, calling application identifier 210, a timestamp 212, an indication of a targeted end point 214 at server application 112, and any other input parameters 216). When generated based on the combination of specific message content in message 250, this MIST token 206 can only be validated if the receiving system 110 generates a matching verification MIST token upon receipt of the message 250. However, because the MIST token 206 is generated based on the specific message content of message 250, alteration of that specific message content by a malicious party who has intercepted the message 250 before it reaches system 110 will in turn cause the verification MIST token generated by the receiving system 110 to be different from the MIST token 206 contained in the message 250. In other words, manipulation of the content of the message 250 will be detectable, and manipulated messages cannot be validated by the receiving system 110.

In this fashion, any given MIST token 206 can only be used for the call to a specific end point with specific input parameter values from a specific calling application and cannot be used to simulate calls from this or any other client application to the same or other end points exposed by the server application. Furthermore, the same token cannot be used to call the same end point with different input parameters, thus preventing a malicious user from exploiting a given end point to retrieve additional information. As noted above and in connection with FIG. 2B, the MIST token 206 of this example is further generated based on the following elements: a timestamp (which reduces the replay window within which a replay attack is possible), a calling system identifier, and a calling system credential (which is provided at system deployment time and exchanged between a system administrator of the calling system 102 and a system administrator of the receiving system 110). The calling system credential may in some embodiments be a large string of characters (which are more secure than passwords that can be remembered by humans), and because it is exchanged between system administrators via a separate channel of communication, it is never transferred through the network segment and therefore cannot be stolen by a malicious user on the network. Finally, even if a malicious user is able to obtain a MIST token, he/she will be highly unlikely to be able to recreate a new MIST token without the calling system credential.

In this fashion, example embodiments disrupt potential for malicious use of stolen tokens, because even if a message is intercepted and the MIST token is stolen, the MIST token is not valid when transmitted with a message that has modified any portion of the specific message content used to generate the MIST token. While a replay attack based on a reusable token can never be entirely prevented in theory, enforcing the integrity of a message transmitted using a MIST token prevents message tampering by malicious parties. Accordingly, example embodiments described herein greatly limit the attack surface of a server application.

Having described an example embodiment utilizing a MIST token in a message transmitted between integrated systems at a high level, the design of the various devices performing various example operations is provided below.

System Architecture

Methods, apparatuses, and computer program products of the present invention may be embodied by any of a variety of devices. Example embodiments may include a plurality of devices operating in a globally-networked system. In doing so, example embodiments may be implemented by devices comprising the calling system 102 or receiving system 110, which may comprise any of a variety of fixed terminals, such as desktop computers, mainframe devices, kiosks, or the like. Similarly, example embodiments may also comprise any of a variety of mobile terminals, such as a portable digital assistant (PDA), mobile telephone, smartphone, laptop computer, tablet computer, or any combination of the aforementioned devices.

Figure 3:
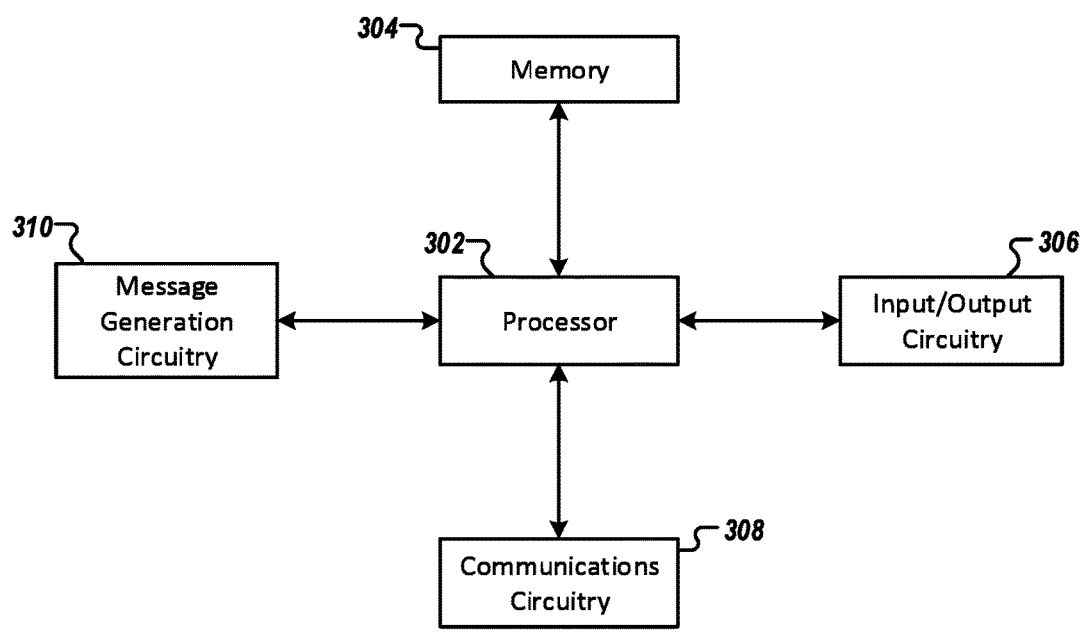
FIG. 3 illustrates a schematic block diagram of example circuitry embodying a calling system that may perform operations in accordance with some example embodiments described herein.

Turning to FIG. 3, an example apparatus 300 is illustrated that may represent a basic set of components of a device embodying an example calling system, such as calling system 102 shown in FIG. 1. The apparatus 300 may include a processor 302, a memory 304, and communications circuitry 308. In some embodiments, the device may further include input/output circuitry 306 for interacting with a user, and message generation circuitry 310 for generating messages secured by corresponding MIST tokens. The apparatus 300 may be configured to execute the operations described below in connection with FIG. 5. Although these components 302-310 are described with some functional descriptors, it should be understood that the particular implementations necessarily include the use of particular hardware. It should also be understood that certain of these components 302-310 may include similar or common hardware. For example, the message generation circuitry 310 may leverage use of the processor 302, memory 304, input/output circuitry 306, and/or communications circuitry 308 to perform their associated functions, and duplicate hardware is not required for the distinct components of the apparatus 300 (although embodiments using duplicated hardware are also contemplated herein). The use of the term "circuitry" as used herein with respect to components of the apparatus therefore includes particular hardware configured to perform the functions associated with the particular circuitry described herein. Of course, while the term "circuitry" should be understood broadly to include hardware, in some embodiments, circuitry may also include software for configuring the hardware components of the apparatus 300.

In some embodiments, the processor 302 (and/or co-processor or any other processing circuitry assisting or otherwise associated with the processor) may be in communication with the memory 304 via a bus for passing information among components of the apparatus. The processor 302 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 302 may be configured to execute instructions stored in the memory 304 or otherwise accessible to the processor. Alternatively or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the memory 304 may be non-transitory and may include, for example, one or more volatile and/or non-volatile memories. In other words, for example, the memory may be an electronic storage device (e.g., a computer readable storage medium). The memory 304 may be configured to store information, data, content, applications, instructions, or the like, for enabling the apparatus to carry out various functions in accordance with example embodiments contemplated herein. For instance, the memory 304 may store configuration values (such as (1) a calling system credential, (2) a framework defining a set of constituent components of a message to use to generate a MIST token and information regarding an order of such components and any delimiters that must be added between components, and (3) a one-way hash function to use to generate the MIST token) needed for generation of secure token, such as a secret key or a key store containing a plurality of multiple keys. In this regard, the memory 304 may further store such configuration values in a secure (e.g., encrypted) fashion.

The apparatus 300 may further include input/output circuitry 306 that may, in turn, be in communication with processor 302 to provide output to a user and, in some embodiments, to receive an indication of user input. The input/output circuitry 306 may comprise a user interface and may include a display that may include a web user interface, a mobile application, a client device, or the like. In some embodiments, the input/output circuitry 306 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally or alternatively, the communication interface 308 may include the circuitry for interacting with the antenna(s) to cause transmission of signals via the antenna(s) or to handle receipt of signals received via the antenna(s). These signals may be transmitted by the apparatus 300 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX), or other proximity-based communications protocols.

In addition, the apparatus 300 may also comprise message generation circuitry 310, which includes hardware components designed to perform functions facilitating generation of messages secured by corresponding MIST tokens. Message generation circuitry 310 may utilize processor 302, memory 304, input/output circuitry 306, or other hardware component included in the apparatus 300 to perform its various functions. Message generation circuitry 310 may further utilize communications circuitry 308 to receive data from a variety of data sources.

Message generation circuitry 310 may utilize processing circuitry, such as the processor 302, to facilitate performance of its various operations, and may utilize memory 304 to store computer instructions that, when executed, cause the message generation circuitry 310 to perform those operations. It should be appreciated that, in some embodiments, message generation circuitry 310 may include a separate processor, specially configured field programmable gate array (FPGA), or application specific interface circuit (ASIC) to perform the above-described functions. Message generation circuitry 310 is therefore implemented using hardware components of the apparatus configured by either hardware or software for implementing these planned functions.

Figure 4:
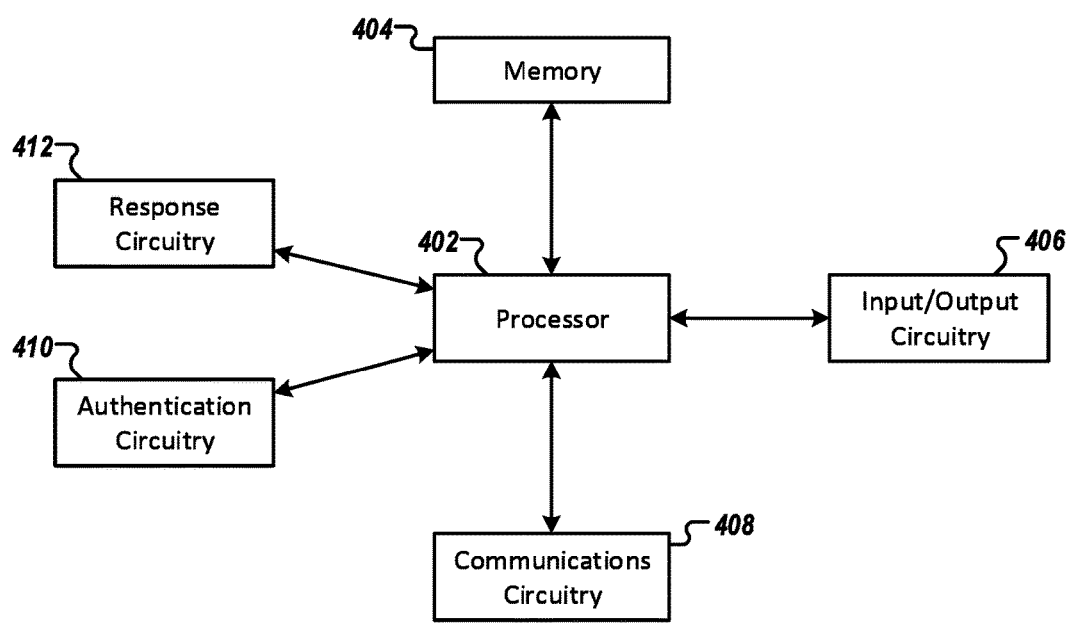
FIG. 4 illustrates a schematic block diagram of example circuitry embodying a receiving system that may perform operations in accordance with some example embodiments described herein.

Turning next to FIG. 4, an example apparatus 400 is illustrated that may represent a basic set of components of a device embodying an example receiving system, such as system 110 shown in FIG. 1. Apparatus 400 may host a server application 112 configured to communicate via a network (e.g., network 108 of FIG. 1) with one or more calling applications 104 hosted by a calling system 102, as described throughout this disclosure.

The apparatus 400 may include a processor 402, a memory 404, input/output circuitry 406, and communications circuitry 408. In addition, the apparatus 400 may further include authentication circuitry 410 for authenticating messages received by the apparatus 400, and response circuitry 412 for generating and transmitting responses to such messages. The apparatus 400 may be configured to execute the operations described below in connection with FIGS. 6 and 7. Although these components 402-412 are described with some functional descriptors, it should be understood that the particular implementations necessarily include the use of particular hardware. It should also be understood that certain of these components 402-412 may include similar or common hardware. For example, authentication circuitry 410 and response circuitry 412 may leverage use of the processor 402, memory 404, input/output circuitry 406, and/or communications circuitry 408 to perform their associated functions, and duplicate hardware is not required for the distinct components of the apparatus 400 (although embodiments using duplicated hardware are also contemplated herein). As with use of the term "circuitry" in connection with the apparatus 300 above, the term "circuitry," when used herein with respect to components of the apparatus 400, includes particular hardware configured to perform the functions associated with the particular circuitry described herein, and while the term "circuitry" should be understood broadly to include hardware, in some embodiments, circuitry may also include software for configuring the hardware components of the apparatus 400.

Because the functionality of processor 402, memory 404, input/output circuitry 406, and communications circuitry 408, and are similar to the functionality described in connection with the similar features of FIG. 3, further description of such functionality is omitted here for brevity only. However, the authentication circuitry 410 and response circuitry 412 provide additional functionality not described previously in connection with FIG. 3, so these components are described below in greater detail.

As noted above, the apparatus 400 comprises authentication circuitry 410, which includes hardware components designed to authenticate messages received by the apparatus 400. Authentication circuitry 410 may utilize any hardware component included in the apparatus 400 to perform its various functions. For instance, authentication circuitry 410 may further utilize communications circuitry 106 to receive messages from or transmit messages to one or more calling systems 102.

Authentication circuitry 410 may utilize processing circuitry, such as the processor 402, to facilitate performance of its various operations, and may utilize memory 404 to store computer instructions that, when executed, cause the authentication circuitry 410 to perform those operations. It should be appreciated that, in some embodiments, authentication circuitry 410 may include a separate processor, specially configured field programmable gate array (FPGA), or application specific interface circuit (ASIC) to perform the above-described functions. Authentication circuitry 410 is therefore implemented using hardware components of the apparatus configured by either hardware or software for implementing these planned functions.

The apparatus 400 may also comprise response circuitry 412, which includes hardware components designed to generate responses to authenticated messages received from other devices and/or systems. Response circuitry 412 may utilize processor 402, memory 404, or any other hardware component included in the apparatus 400 to perform this function.

Response circuitry 412 may utilize processing circuitry, such as the processor 402, to facilitate performance of its various operations, and may utilize memory 404 to store computer instructions that, when executed, cause the response circuitry 412 to perform its operations. It should be appreciated that, in some embodiments, response circuitry 412 may include a separate processor, specially configured field programmable gate array (FPGA), or application specific interface circuit (ASIC) to perform the above-described functions. Response circuitry 412 is therefore implemented using hardware components of the apparatus configured by either hardware or software for implementing these planned functions.

As described above and as will be appreciated based on this disclosure, example embodiments may be implemented by a plurality of devices, such as fixed devices, mobile devices, backend network devices, and/or the like. Accordingly, embodiments may comprise various means including entirely of hardware or combination of hardware with software. Furthermore, embodiments may take the form of a computer program product stored on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

It should be appreciated, with respect to certain devices embodied by apparatuses 300 or 400 as described in FIGS. 3 and 4, computer program instructions and/or other type of code may be loaded onto a computer, processor or other programmable apparatus's circuitry to produce a machine, such that the computer, processor other programmable circuitry that execute the code on the machine create the means for implementing various functions described herein.

Having described specific components of example devices (e.g., apparatuses 300 and 400) that may be utilized to implement some embodiments of the calling system 104 and receiving system 110 described herein, example procedures for using MIST tokens in message transmission are described below in connection with a series of flowcharts.

Operations for Generating Messages Using MIST Tokens

Figure 5:
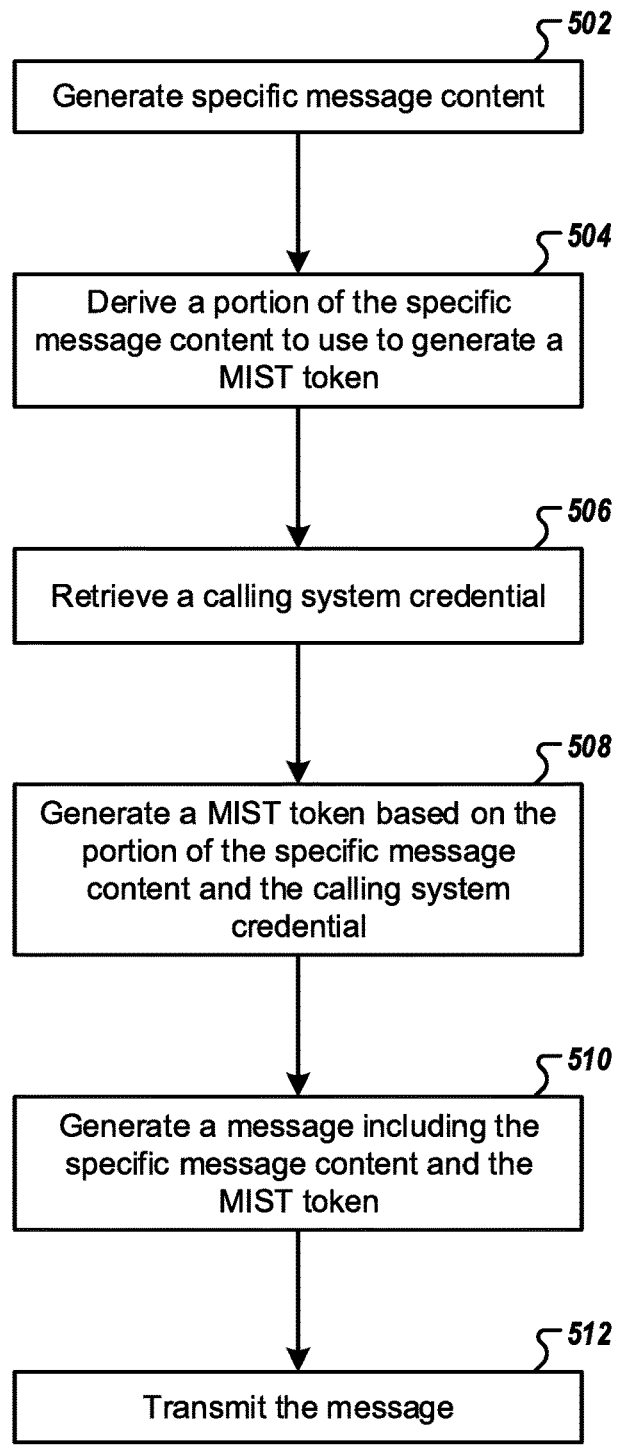
FIG. 5 illustrates a flowchart describing example operations performed by a calling system to create a MIST token to enhance trustworthiness of messages generated by a calling application hosted by the calling system, in accordance with some example embodiments described herein.

Turning to FIG. 5, a flowchart is illustrated that contain operations for enhancing the trustworthiness of a message generated by a calling application through the use of a MIST token. The operations illustrated in FIG. 5 may, for example, be performed by a calling system hosting a calling application, in which the calling system comprises or is under the control of an apparatus 300. The various operations described in connection with FIG. 5 may thus be performed by the apparatus 300 by or through the use of one or more of processor 302, memory 304, communications circuitry 306, input/output circuitry 308, and message generation circuitry 310.

Turning first to operation 502, the apparatus 300 includes means, such as message generation circuitry 310 or the like, for generating specific message content for the message. It will be appreciated that the operations described herein may be utilized to secure any sort of message that will be delivered from a calling system to a receiving system, and the message could be generated using any suitable protocol. The specific message content may vary in content based on the particular requirements of the protocol being used. For instance, if the message comprises a Hypertext Transfer Protocol (HTTP) request, the specific message content may include header information and possibly message body parameters and one or more attachments. In other words, the constituent components of the specific message content may vary in various embodiments. That said, inclusion of certain elements within the specific message content may increase the security provided by example embodiments described herein. For instance, including a time stamp in the specific message content of a message may not be strictly required, but as described below in connection with operation 504-508, generation of a MIST token that is based in part on a time stamp can greatly shrink the window within which a replay attack may be effective. Similarly, although perhaps not always necessary, inclusion of a calling application identifier, a calling system identifier, and a target end point within the specific message content enables generation of a MIST token that can harden the message against replay attacks designed to alter any of these elements. Accordingly, in many embodiments, the specific message content will include a time stamp, a calling application identifier, a calling system identifier, a target end point, and a set of additional input parameters defining any further elements needed.

Turning to operation 504, the apparatus 300 includes means, such as message generation circuitry 310, or the like, for using the retrieved framework and the specific message content to derive a particular portion of the specific message content to be used to generate a MIST token. In this regard, the framework defines a set of constituent components of the specific message content that comprise the particular portion of the specific message content will be used to generate the MIST token. Accordingly, deriving this portion of the specific message content may comprise retrieval of the values for each of the constituent components of the specific message content as defined in the framework.

In some embodiments, the framework further identifies an order in which the one-way hash function must be applied to the constituent components of the specific message content and to the calling system credential in order to generate the MIST token. Accordingly, the portion of the specific message content may thus be arranged in the order defined by the framework prior to application of the one-way hash function. In yet further embodiments, the framework may specify a particular delimiter (e.g., a dash, semicolon, pipe, or the like.) to insert between the various elements to which the one-way hash function is applied. Accordingly, the portion of the specific message content may thus be modified to insert appropriate delimiters as set forth in the framework to ensure that the formatting is suitable for application of the one-way hash function. In this way, the framework can provide additional layers of obfuscation to the process for generating the MIST token based on the specific message content that could prevent malicious access.

In some embodiments, the framework may specify that entirety of the specific message content will be used to generate the MIST token, although this is not necessary in every implementation and, even in such implementations, the framework may still provide additional information regarding the ordering of the various components and whether to add delimiters between them before applying the one-way hash function.

It will be understood that in various embodiments the framework, as with the calling system identifier itself, is communicated between system administrators managing the calling system and receiving system using separate channels of communication than that provided by, for instance, network 104 of FIG. 1. For instance, upon initial setup of the MIST token process, the system administrators may agree upon the framework over the phone, or in person, or via physical mail, such that a malicious user who can intercept electronic communications between the calling system and the receiving system is never able to see the communication of the framework itself. Moreover, if a system administrator believes that the framework has been compromised in some way, the separate channel of communication may be used to modify the framework to define a different set of steps for generation of the MIST token from the specific message content and the calling system identifier.

Turning to operation 506, the apparatus 300 includes means, such as message generation circuitry 310, or the like, for retrieving a calling system credential. The calling system credential, like the framework discussed directly above, may be exchanged between the calling system and the receiving system via a separate channel of communication distinct from that used to convey electronic messages between the systems. Although the calling system and receiving system will both store the calling system credential locally, the calling system credential itself will never be transferred through the network, a malicious user able to intercept messages transmitted via the network can never retrieve the calling system credential. It will be understood that in many embodiments, the calling system credential will comprise a large string of characters to prevent human remembrance of the calling system credential.

Turning to operation 508, the apparatus 300 includes means, such as message generation circuitry 310 or the like, for generating a MIST token by applying the one-way hash function to a combination of the calling system credential (which, as noted above, may not be included in the specific message content) and a particular portion of the specific message content. It will be understood that, the apparatus 300 generates the MIST token using a one-way hash function retrieved by the message generation circuitry 310 from a memory 304, and that the one-way hash function, like the framework described above and the calling system credential, may be exchanged between the calling system and the receiving system via a separate channel of communication. It will further be understood that the one-way hash function may be any such function known in the art.

In some embodiments, there may be more than a single one-way function associated with the apparatus 300. For instance, the one-way hash function and the framework used to generate the MIST token may be different for different calling applications, thus lending an increased layer of security insofar as breach of the security for one calling application may not produce cascading problem for all calling applications of the calling system 102. In such embodiments, the message generation circuitry 310 may further retrieve a calling application identifier of the calling application 104 that is responsible for the message, and one or both of the one-way hash function and the framework may be retrieved only using the calling application identifier.

It will be understood in this regard that if the calling system 102 (or a system administrator thereof) has a reason to believe that the framework or the one-way hash function has been compromised but that the calling system credential has not been compromised, then the calling system 102 may still utilize a MIST token generated using the calling system credential to transmit a secure message to the receiving system 110, and that secure message may include an indication of a different one-way hash function and/or framework to implement in future transmissions between the systems. Notably, the new one-way hash function and/or framework themselves need not be transmitted in that message, as the indication can simply identify one of many preconfigured security models that in turn can be used by the receiving system 110 to independently derive the new one-way hash function and/or framework, thus facilitating electronic communication of a change to the one-way hash function and/or framework without requiring transmission of the new one-way hash function and/or framework over the network, and also without requiring separate transmission of such updates by one system administrator to the other.

Turning to operation 510, the apparatus 300 includes means, such as message generation circuitry 310 or the like, for generating the message itself, such that the message includes the specific message content and the message integrity secure token Finally, in operation 512, the apparatus 300 includes means, such as communications circuitry 308, message generation circuitry 310, or the like, for transmitting the message, presumably to the receiving system to prompt action by a server application hosted thereon.

By securing the message with a MIST token generated using the specific content of the message itself, even if a malicious user is able to intercept the message while it is in transit to the receiving system, the integrity of the message is protected by the MIST token. Either the malicious user will alter the message in a way that the MIST token no longer corresponds to the content of the message (which will result in the MIST token no longer being a valid MIST token for the changed message) or the malicious user will not alter the message, in which case integrity of the message is retained. Either way, securing the message with the MIST token enhances the trustworthiness of the message, both by ensuring that the receiving system will trust that it was sent by the calling system, and by ensuring that the content of the message is not altered.

Having described an example procedure for generating and transmitting a message secured by a MIST token in connection with FIG. 5, example embodiments are described below that are performed by a receiving system to use MIST token verification of inbound messages to limit an attack surface of a server application hosted by the receiving system.

Figure 6:
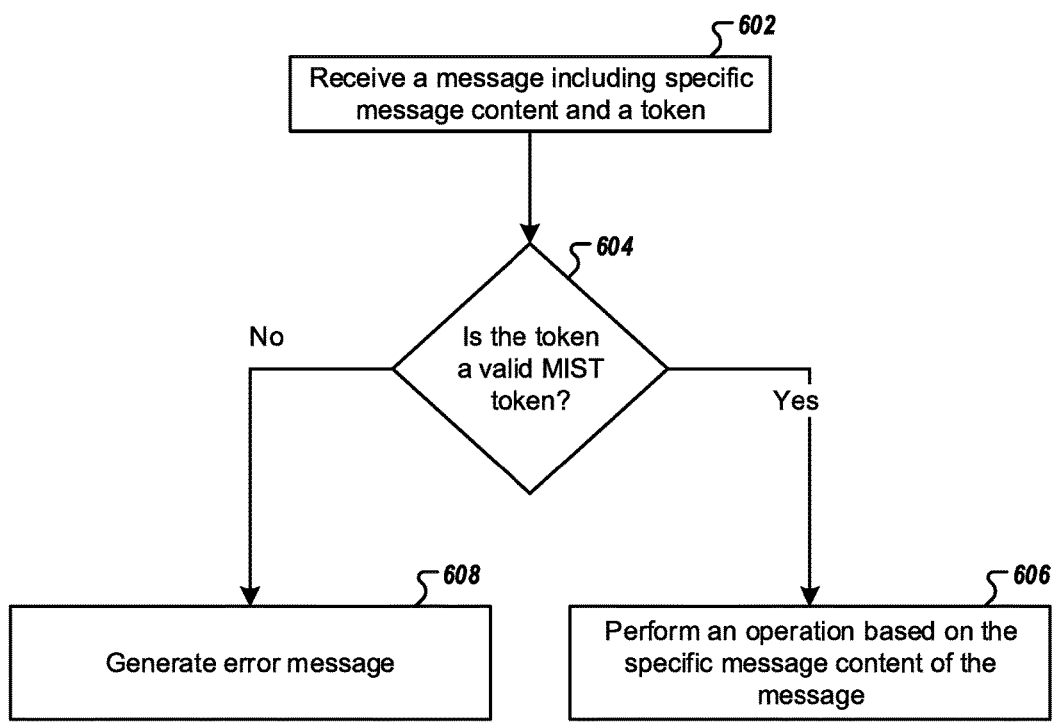
FIGS. 6 and 7 illustrate flowcharts describing example operations performed by a receiving system to use MIST token authentication to limit an attack surface of a server application hosted by the receiving system, in accordance with some example embodiments described herein.
Figure 7:
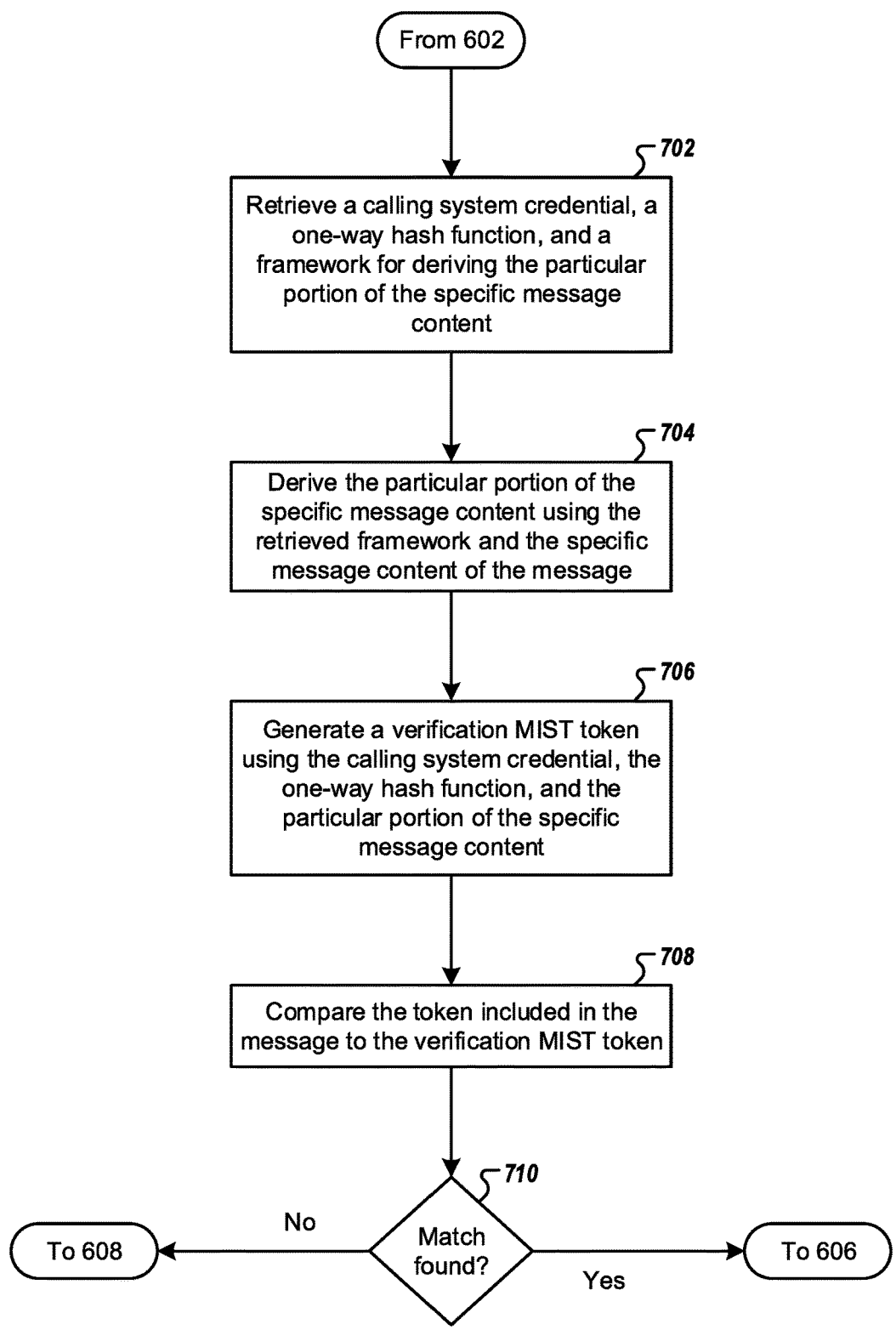

Operations for Verifying Integrity of Messages Transmitted to a Server Application FIGS. 6 and 7 illustrate flowcharts containing operations for limiting an attack surface of a server application by verifying integrity of messages transmitted to the server application. The operations illustrated in FIGS. 6 and 7 may, for example, be performed by a receiving system hosting a server application, in which the receiving system comprises or is under the control of an apparatus 400. The various operations described in connection with FIGS. 6 and 7 may thus be performed by the apparatus 400 by or through the use of one or more of processor 402, memory 404, communications circuitry 406, input/output circuitry 408, authentication circuitry 410, and response circuitry 412.

Turning first to FIG. 6, the procedure begins at operation 602, in which the apparatus 400 includes means, such as communications circuitry 406, authentication circuitry 410, or the like, for receiving a message including specific message content and a token. The following operations describe an example procedure by which the integrity of the message can be evaluated based on a comparison of the token to a MIST token generated by the apparatus 400 based on the contents of the message.

Accordingly, at operation 604, the apparatus 400 includes means, such as authentication circuitry 410, or the like, for determining whether the token included in the message is a valid MIST token. Specific operations for making this determination are described in greater detail in connection with FIG. 7 below. For ease of understanding, it will be understood that this determination is based on the specific message content retrieved from the message itself, and on a calling system credential, a one-way hash function, and a framework for identifying the particular portion of the specific message content should be used to generate the verification MIST token, all of which are known by the apparatus 400. The token comprises a valid message integrity secure token in an instance in which the token matches a result produced by applying the one-way hash function to a combination of the calling system credential and a particular portion of the specific message content defined by the framework known by the apparatus 400.

In any event, regardless of the specific manner by which the authentication circuitry 410 determines whether the token included in the message is a valid MIST token, the procedure advances to either operation 606 (if the token is a valid MIST token) or operation 608 (if not).

Turning first to operation 606, the apparatus 400 includes means, such as response circuitry 412 or the like, for performing, by response circuitry of the receiving system, an operation in response to the message. This operation may be any operation requested by the message itself. For instance, if the message comprises an HTTP request (e.g., a "GET" or "POST" method), this operation may complete the method requested in the message.

Finally, operation 608 represents an operation that is reached only when the authentication circuitry 410 determines that the token in the message is not a valid MIST token. In this circumstance, the apparatus 400 includes means, such as authentication circuitry 410, or the like, for generating an error message, such as an unauthorized exception message. In some embodiments, the apparatus 400 further includes means, such as authentication circuitry 410 for causing transmission (e.g., by communications circuitry 408) of the error message to the calling system identified in the message. In other embodiments, the error message is not transmitted, but the procedure nevertheless ends and any request contained in the received message may simply not be performed.

It will be appreciated that generation of an error message may be an indication that a MIST token has been intercepted or otherwise stolen by a malicious user. Accordingly, generation of the error message and/or transmission of the error message to the calling system may act as a signal to the calling system and/or the receiving system of a detected security breach. Accordingly, following operation 608, the apparatus 400 may include means, such as processor 402, authentication circuitry 410, or the like, for determining whether to initiate an authentication reconfiguration procedure. In some embodiments, the authentication reconfiguration procedure will be initiated every time an error message is generated. In other embodiments, the authentication reconfiguration procedure may be initiated after a predetermined number of error messages are generated, or after a particular pattern of error messages are generated. Such a procedure may include prompting a system administrator of the receiving system 400 to contact a corresponding system administrator of the calling system 300 to reconfigure the protocol for generating MIST tokens. Such reconfiguration may be designed to increase security by making the token generation more complex, or may simply alter the procedure itself. In this regard, reconfiguration of the processor for generating MIST tokens may involve: (1) reconfiguration of system credentials (e.g., the calling system credential), (2) alteration of the one-way hash function (either switching to a different function entirely or modifying the strength of the function), (3) alteration of the framework defining how many aspects of the specific message content are as part of the MIST token hash, (4) alteration of the order in which the hashed elements are assembled, or (5) alteration of the delimiter used between values to be hashed. All these changes can be done quickly through configuration of both the calling system 102 and receiving system 110, potentially without modifying or recompiling the code of the calling system 102 or the receiving system 110.

Turning next to FIG. 7, a series of operations are described for determining if a token in a received message is a valid MIST token for the received message. The procedure shown in FIG. 7 illustrates a more detailed example of the steps taking place at operation 604 of FIG. 6. Operation 702 is thus reached in response to operation 602 of FIG. 6, and following completion of operation 710, the procedure advances to either operation 606 (if the token is a valid MIST token) or operation 608 (if not).

At operation 702, the apparatus 400 includes means, such as authentication circuitry 410, or the like, for retrieving a calling system credential, a one-way hash function, and the framework for deriving the particular portion of the specific message content to use to generate a verification MIST token. Retrieval of these three components occurs in a similar way as is described above in connection with operations 504-508 of FIG. 5. All three of these components may be exchanged between the calling system 102 and the receiving system 110 via a separate channel of communication distinct from that used to convey electronic messages between the two systems. Although the calling system 102 and the receiving system 110 will both store these elements locally, they are thus never transferred through the network, so a malicious user able to intercept messages transmitted via the network can never retrieve these elements, and in turn, can never use them to reconstruct a MIST token from the specific content of a message.

As described previously in connection with operations of the calling system 102, it will be understood that if the receiving system 110 (or a system administrator thereof) has a reason to believe that the framework or the one-way hash function has been compromised but that the calling system credential has not been compromised, then the receiving system 110 may still utilize a MIST token generated using the calling system credential to transmit a secure message to the calling system 102, and that secure message may include an indication of a different one-way hash function and/or framework to implement in future transmissions between the systems. Notably, the new one-way hash function and/or framework themselves need not be transmitted in that message, as the indication can simply identify one of many preconfigured security models that in turn can be used by the calling system 102 to independently derive the new one-way hash function and/or framework, thus facilitating electronic communication of a change to the one-way hash function and/or framework without requiring transmission of the new one-way hash function and/or framework over the network, and also without requiring separate transmission of such updates by one system administrator to the other.

To add an additional layer of security to the overall transaction, in some embodiments the one-way hash function and the framework used to generate the MIST token may be different for different calling applications 104. In such embodiments, the authentication circuitry 310 may further retrieve a calling application identifier from the message, and one or both of the one-way hash function and the framework may be retrieved only using this calling application identifier.

Turning now to the use of the framework, it will be understood that, as noted previously, the framework defines a set of constituent components of the specific message content that comprise the particular portion of the specific message content that should be used to generate a valid MIST token corresponding to the specific message content. Moreover, in some embodiments, the framework further identifies an order in which the one-way hash function must be applied to the constituent components of the specific message content and to the calling system credential in order to generate the MIST token. In yet further embodiments, the framework may specify a particular delimiter (e.g., a dash, semicolon, pipe, or the like.) to insert between the various elements to which the one-way hash function is applied. In this way, the framework can provide additional layers of obfuscation to the process for generating a MIST token based on the specific message content.

In some embodiments, the framework may specify that the entirety of the specific message content will be used to generate the MIST token, although this is not necessary in every implementation and, even in such implementations, the framework may still provide additional information regarding the ordering of the various components and whether to add delimiters between them before applying the one-way hash function.

At operation 704, the apparatus 400 includes means, such as authentication circuitry 410 or the like, for deriving, using the retrieved framework and the specific message content, the particular portion of the specific message content to be used to generate a MIST token based on the specific message content. In this regard, deriving this portion of the specific message content may comprise retrieval of the values for each of the constituent components of the specific message content as defined in the framework. Moreover, in embodiments in which the framework identifies an ordering of the constituent components, the portion of the specific message content may thus be arranged in the order defined by the framework prior to application of the one-way hash function. Finally, in embodiments in which the framework specifies a particular delimiter to insert between the various elements to which the one-way hash function is applied, the portion of the specific message content may thus be modified to insert appropriate delimiters as set forth in the framework.

At operation 706, the apparatus 400 includes means, such as authentication circuitry 410 or the like, for generating a verification MIST token by applying the retrieved one-way hash function to a combination of the retrieved calling system credential and the derived particular portion of the specific message content. Generation of a verification MIST token occurs in the exact same way as generation of a MIST token described previously in connection with FIG. 5.

At operation 708, the apparatus 400 includes means, such as authentication circuitry 410, or the like, for comparing the token from the received message to the verification message integrity security token. Finally, as shown at operation 710, the procedure advances to either operation 606 or operation 608 based on whether the comparison of the token included in the message matches the MIST token or not. In this regard, the token and the verification MIST token will typically match when they are identical, although the precise nature of how a match may be identified may vary based on the nature of the one-way hash function. Either way, authoritative action can thus be taken once the token is properly identified as a valid MIST token or not.

As described above, example embodiments described herein thus provide methods and apparatuses that disrupt potential for malicious use of stolen tokens, because even if a message is intercepted and the MIST token is stolen, the stolen MIST token will not be valid when transmitted with a message that has modified any portion of the specific message content used to generate the MIST token. While a replay attack based on a reusable token can never be entirely prevented in theory, enforcing the integrity of a message transmitted using a MIST token serves to both authenticate a source of the message and prevent message tampering by malicious parties. Accordingly, example embodiments described herein greatly limit the attack surface of a server application.

FIGS. 5, 6, and 7 illustrate flowcharts describing the operation of apparatuses, methods, and computer program products according to example embodiments contemplated herein. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory of an apparatus 300 or apparatus 400 and executed by a processor of the apparatus 300 or apparatus 400. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware and computer instructions.

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for limiting an attack surface of a server application by verifying integrity of messages transmitted to the server application, the method comprising:

receiving, by communications circuitry of a receiving system hosting the server application, a message including specific message content and a token;

determining, by authentication circuitry of the receiving system and using the specific message content, whether the token comprises a valid message integrity secure token, wherein the token comprises a valid message integrity secure token in an instance in which the token matches a result produced by applying a one-way hash function to a combination of (1) a calling system credential and (2) a particular portion of the specific message content; and in an instance in which the authentication circuitry of the receiving system determines that the token comprises a valid message integrity secure token, performing, by response circuitry of the receiving system, an operation in response to the message.

2. The method of claim 1, wherein determining whether the token comprises a valid message integrity secure token includes:

retrieving, from a memory of the receiving system, the calling system credential, the one-way hash function, and a framework for deriving the particular portion of the specific message content;

deriving, by the authentication circuitry of the receiving system and using the retrieved framework and the specific message content, the particular portion of the specific message content;

generating, by the authentication circuitry of the receiving system, a verification message integrity security token by applying the retrieved one-way hash function to a combination of the retrieved calling system credential and the derived particular portion of the specific message content;

comparing, by the authentication circuitry of the receiving system, the token to the verification message integrity security token; and in an instance in which the token matches the verification message integrity security token, determining, by the authentication circuitry of the receiving system, that the token comprises a valid message integrity secure token.

3. The method of claim 2, wherein the specific message content includes a calling application identifier, and wherein at least one of the one-way hash function and the framework is retrieved using the calling application identifier.

4. The method of claim 2, wherein the framework for deriving the particular portion of the specific message content defines a set of constituent components of the specific message content that comprise the particular portion of the specific message content.

5. The method of claim 2, wherein the framework for deriving the particular portion of the specific message content further identifies an order in which the one-way hash function must be applied to the constituent components of the specific message content and to the calling system credential in order to generate the verification message integrity security token.

6. The method of claim 1, wherein the specific message content includes a time stamp, a calling application identifier, a calling system identifier, a target end point, and a set of additional input parameters.

7. The method of claim 1, wherein the portion of the specific message content comprises an entirety of the specific message content.

8. The method of claim 1, further comprising:

in an instance in which the authentication circuitry of the receiving system determines that the token does not comprise a valid message integrity secure token, generating, by the authentication circuitry of the receiving system, an error message.

9. An apparatus for limiting an attack surface of a server application hosted by the apparatus by verifying integrity of messages transmitted to the server application, the apparatus comprising:

communications circuitry configured to receive a message including specific message content and a token, authentication circuitry configured to determine, using the specific message content, whether the token comprises a valid message integrity secure token wherein the token comprises a valid message integrity secure token in an instance in which the token matches a result produced by applying a one-way hash function to a combination of (1) a calling system credential and (2) a particular portion of the specific message content; and response circuitry configured to perform, in an instance in which the authentication circuitry determines that the token comprises a valid message integrity secure token, an operation in response to the message.

10. The apparatus of claim 9, wherein the authentication circuitry is configured to determine whether the token comprises a valid message integrity secure token by being configured to:

cause retrieval, from a memory of the receiving system, of the calling system credential, the one-way hash function, and a framework for deriving the particular portion of the specific message content;

derive, using the retrieved framework and the specific message content, the particular portion of the specific message content;

generate a verification message integrity security token by applying the retrieved one-way has function to a combination of the retrieved calling system credential and the derived particular portion of the specific message content;

compare the token to the verification message integrity security token; and in an instance in which the matches the verification message integrity security token, determine that the token comprises a valid message integrity security token.

11. The apparatus of claim 10, wherein the specific message content includes a calling application identifier, and wherein the authentication circuitry is configured to retrieve at least one of the one-way hash function and the framework using the calling application identifier.

12. The apparatus of claim 10, wherein the framework for deriving the particular portion of the specific message content:

defines a set of constituent components of the specific message content comprising the particular portion of the specific message content; and identifies an order in which the one-way hash function must be applied to the constituent components of the specific message content and to the calling system credential in order to generate the verification message integrity secure token.

13. The apparatus of claim 9, wherein the portion of the specific message content comprises an entirety of the specific message content.

14. A method for enhancing trustworthiness of a message generated by a calling application, the method comprising:

generating, by message generation circuitry of a calling system hosting the calling application, specific message content for the message;

generating, by the message generation circuitry of the calling system, a message integrity secure token by applying a one-way hash function to a combination of a calling system credential that is not included in the specific message content and a particular portion of the specific message content;

generate the message by the message generation circuitry of the calling system, wherein the message includes the specific message content and the message integrity secure token; and transmitting the message by communications circuitry of the calling system.

15. The method of claim 14, further comprising, prior to generating the message integrity secure token:

retrieving, from a memory of the calling system, the calling system credential, the one-way hash function, and a framework for deriving the particular portion of the specific message content; and deriving, by the message generation circuitry of the calling system and using the retrieved framework and the specific message content, the particular portion of the specific message content.

16. The method of claim 15, further comprising:
retrieving a calling application identifier,
wherein at least one of the one-way hash function and the framework is retrieved using the calling application identifier.

17. The method of claim 15, wherein the framework for deriving the particular portion of the specific message content defines a set of constituent components of the specific message content that comprise the particular portion of the specific message content.

18. The method of claim 15, wherein the framework for deriving the particular portion of the specific message content further identifies an order in which the one-way hash function must be applied to the constituent components of the specific message content and to the calling system credential in order to generate the message integrity secure token.

19. The method of claim 14, wherein the specific message content includes a time stamp, a calling application identifier, a calling system identifier, a target end point, and a set of additional input parameters.

20. The method of claim 14, wherein the portion of the specific message content comprises an entirety of the specific message content.

* * * * *